United States Patent
Hanselmann et al.

(10) Patent No.: US 7,946,178 B2
(45) Date of Patent: May 24, 2011

(54) VACUUM MEASURING CELL DEVICE HAVING A HEATER

(75) Inventors: Hansjakob Hanselmann, Oberschan (CH); Claudio Christoffel, Chur (CH); Stanislav Duris, Frümsen (CH)

(73) Assignee: Inficon GmbH, Bad Ragaz (CH)

( * ) Notice: Subject to any disclaimer, the term of this patent is extended or adjusted under 35 U.S.C. 154(b) by 47 days.

(21) Appl. No.: 12/665,125

(22) PCT Filed: Jun. 9, 2008

(86) PCT No.: PCT/CH2008/000257
§ 371 (c)(1),
(2), (4) Date: Dec. 17, 2009

(87) PCT Pub. No.: WO2008/154760
PCT Pub. Date: Dec. 24, 2008

(65) Prior Publication Data
US 2010/0186516 A1    Jul. 29, 2010

(30) Foreign Application Priority Data
Jun. 19, 2007  (CH) ........................ 0985/07

(51) Int. Cl.
G01L 13/02 (2006.01)
G01L 9/12 (2006.01)
G01L 7/00 (2006.01)
(52) U.S. Cl. ................. 73/706; 73/718; 73/724
(58) Field of Classification Search ........................ None
See application file for complete search history.

(56) References Cited

U.S. PATENT DOCUMENTS

| | | | |
|---|---|---|---|
| 6,591,687 B1 * | 7/2003 | Bjoerkman et al. | 73/724 |
| 2003/0118802 A1 * | 6/2003 | Bjoerkman | 428/220 |
| 2007/0120568 A1 * | 5/2007 | Bjorkman et al. | 324/460 |
| 2008/0110269 A1 * | 5/2008 | Strietzel et al. | 73/718 |
| 2008/0307890 A1 * | 12/2008 | Wuest | 73/715 |
| 2009/0158853 A1 * | 6/2009 | Berner et al. | 73/724 |
| 2009/0320605 A1 * | 12/2009 | Antila et al. | 73/718 |
| 2010/0146771 A1 * | 6/2010 | Bertsch et al. | 29/595 |

* cited by examiner

*Primary Examiner* — Andre J Allen
(74) *Attorney, Agent, or Firm* — Notaro, Michalos & Zaccaria P.C.

(57) ABSTRACT

The invention relates to a vacuum measuring cell device comprising a vacuum membrane measuring cell (8) having a connecting means (5, 6) arranged thereon for a communicating connection to the medium to be measured, an electronic system (34), which is electrically connected to the vacuum membrane measuring cell (8), and also comprising a heating arrangement (20, 21) for heating the vacuum membrane measuring cell (8) to a predefinable temperature value, wherein the heating arrangement (20, 21) substantially encloses the entire vacuum membrane measuring cell (8) such that said cell forms a thermal container (20). Said container constitutes a thermal body (20a) in the area of the connecting means (5, 6) and connecting means (6) are guided through it, the connecting means thereby being thermally contacted at least in some areas by the thermal body. The thermal container (20a) comprises a heating source (21) for the heating thereof. The thermal container (20) is substantially entirely enclosed by an insulating shell (22).

20 Claims, 6 Drawing Sheets

VACUUM MEASURING CELL DEVICE HAVING A HEATER

FIELD AND BACKGROUND OF THE INVENTION

The invention relates to a vacuum measuring cell device with a heating configuration.

It is known to measure pressures or pressure differences by pressurizing a thin diaphragm and measuring its deflection. A known and suitable method for measuring the deflection of such diaphragms comprises implementing the diaphragm arrangement as a variable electric capacitor, wherein, via an electronic measuring circuitry, the capacitance change is analyzed in known manner, which change correlates with the pressure change. The capacitor is formed by disposing the thin flexible diaphragm surface at a minimal spacing opposite a further surface and coating both opposing surfaces with an electrically conducting coating or implementing them of an electrically conductive material. Upon pressure being applied to the diaphragm, through the deflection the spacing between the two electrodes changes leading to an analyzable capacitance change of the arrangement. Sensors of this type are produced of silicon in large piece numbers. The areal base body as well as also the diaphragm are herein often entirely comprised of silicon material. There are also designs with combined material composition, for example silicon with a glass substrate. The sensors can thereby be produced cost-effectively. As a rule, pressure sensors of this type are only applicable for higher pressure ranges in the range of approximately $10^{-1}$ mbar to a few bar. High resolution at lower pressures starting at approximately $10^{-1}$ mbar are no longer realizable utilizing silicon as the material. Sensors of this type are only conditionally suitable for typical vacuum applications. One of the reasons is that silicon reacts on its surface with the environment and in this way the sensitive sensor characteristic is disturbed. Water vapor contained in normal atmospheric air already leads to corresponding reactions on the surfaces. The problem is additionally exacerbated if the sensor is employed in chemically aggressive atmospheres, which is increasingly common in current reactive vacuum plasma processes.

One important application field are processes in the semiconductor industry. Here, semiconductors are produced utilizing, for example, the following techniques: chemical vapor deposition (CVD), physical vapor deposition (PVD), implanting and (dry) etching processes. Typical pressure ranges for processes in the semiconductor industry and pressure ranges of vacuum measuring cells typically operate in the range of $10^{-4}$ to 10 mbar. Typical process measuring cells for the application are capacitive diaphragm measuring cells. In such processes, such as for example in vacuum etching methods, in particular, especially aggressive media, such as fluorine, bromic acid and their compounds are employed. Due to such corrosion and resistance problems, the known silicon pressure sensors and diaphragm measuring cells with metallic diaphragms can only be employed to a limited extent.

For such applications there is increasing demand for being able to operate the diaphragm measuring cell at increased temperatures in order to be able to operate the measuring cell, for one, in a hot process environment and/or to avoid as much as possible condensates in the measuring cell and to do this at high corrosion resistance.

There is expectation that the market demand for high-temperature diaphragm measuring cells will increase over the next years, for example due to the introduction of atomic layer deposition (ALD) in semiconductor production processes, which require pressure measurements at temperatures up to 300° C. or higher in certain applications. The apparatus structure for ALD processes is very similar to that of low pressure CVD (LPCVD) or CVD apparatus, which today are the most significant purchasers of measuring cells which are operated at increased temperatures.

A diaphragm measuring cell preferred for these applications is the capacitive diaphragm measuring cell (CDG). A capacitive diaphragm measuring cell, also referred to as capacitance diaphragm gauge (CDG), is based on the elastic deformation of a thin diaphragm, which is suspended over a solid, areal body and thus separates two volumes from one another. A pressure change in these volumes induces the diaphragm to move. The distance between the housing and the diaphragm changes. The diaphragm is deflected more strongly at high pressures than at low pressures. Metallic electrodes are disposed in the gap region on the diaphragm and on the base body which is opposite the diaphragm. These two metal electrodes form a condenser capacitance. The capacitance change is consequently a measure of the pressure change. This measuring principle is independent of the type of gas.

It has therefore been proposed to produce measuring cells for vacuum pressure measurements of corrosion-resistant materials such as $Al_2O_3$. U.S. Pat. No. 6,591,687 B1 describes a capacitive vacuum measuring cell (CDG) which is substantially structured entirely of ceramic and thus is highly corrosion resistant. The content of this patent is herewith declared to be an integrated component of the present invention description. In order to measure, for example, very low pressures up to $10^{-6}$ mbar with high accuracy, a very thin ceramic diaphragm of 25 μm to 950 μm thickness is preferably utilized, which is disposed substantially symmetrically in a ceramic housing. This diaphragm based vacuum measuring cell is commercially highly successful and indicates a significant advance with respect to corrosion resistance.

A further preferred diaphragm measuring cell device is based on the above described measuring cell of $Al_2O_3$ and utilizes a similar structure, wherein the degree of deflection of the diaphragm in this case takes place with the aid of optical means. In an optical diaphragm measuring cell, also referred to as optical diaphragm gauge (ODG), the pressure-dependent deflection of the diaphragm in the sensor is measured with the aid of an optical system, wherein the measured signal is conducted using fiber optics to the optical signal processing unit, which subsequently converts the optical signal into an electrical signal. The coupling-in of the light necessary for this purpose takes place via appropriately light-permeable regions on the housing of the sensor directly onto the diaphragm. From here the light is reflected back. The device forms part of an interferometric Fabry-Perot system. In the associated interferometer through the signal analysis the degree of diaphragm deflection is measured, which is the measure of the obtaining vacuum pressure to be measured. The optical windows are advantageously produced of sapphire such that at least portions of the housing of the diaphragm vacuum measuring cell comprise sapphire. It is also advantageous if the diaphragm itself is comprised of sapphire. The optical signal can be conducted, for example over large distances (even kilometers), with very low attenuation and without falsification through ambient disturbances, such as primarily electromagnetic interferences, vibrations and changes of ambient temperatures. Such a measuring cell can also be operated especially well as a heated measuring cell. A preferred disposition of an optical vacuum measuring cell has been described in the US application 2007 0089524 A1. The content of this patent application is herewith declared to be an integrated component of the present invention description.

A further improvement of the service life of such diaphragm measuring cells comprises that the connection regions between diaphragm and housing, as well as of the connection region for the connection fitting, and optionally the connection fitting, even when employed in aggressive process environments containing, for example, acids, halogens such as chlorine and fluorine, are covered and protected additionally with a thin corrosion-resistant layer. The deposition of such a protective layer, preferably of a metal oxide, is advantageously carried out with the aid of an ALD method, as is proposed in the patent application CH 01817/06. The content of this patent application is herewith declared to be an integrated component of the present invention description.

As already stated, in processes with aggressive gases, under especially high requirements made of measuring accuracy and long-term stability, heated measuring cells are preferably employed. Condensate depositions, for example, can thereby be decreased or avoided in regions within the measuring cell exposed to the process environment. Through the precise stabilization of the measuring cell temperature, instabilities through temperature effects can also be compensated. For this purpose, correspondingly high complexities and costs are expended.

For example, heating jackets are placed about the measuring cell, such as foil heating elements or heating tapes, which, in turn, are insulated in complex manner. The requisite electronic measuring circuitry, in turn, must be protected against these temperatures, for example by disposition at a spacing and through additional cooling measures, such as using ventilators and cooling bodies. Often additional heating elements, such as heating tapes, are utilized for heating the tubular inlets to the measuring cell. The temperatures are set to fixedly graduated values, such as for example 4° C., 100° C., 160° C. and 200° C., depending on the application range for the processes to be measured.

These known devices do not permit an especially compact and economic structure. Flexible handling on process installations is thereby also made more difficult. The temperature distribution is not very homogeneous and precise. Undesirable temperature fluctuations on the measuring cell occur, which have an unfavorable effect on measuring accuracy or reproducibility. The temperature regulation is slow and inert and difficult of realization. Especially at higher temperature application, the electronic circuitry must be especially protected. This leads to large and bulky constructions, in particular with applications at higher temperatures. The critical area of the vacuum connection of the measuring cell requires additional regulated heating configurations in order to avoid hot or cold zones which lead to negative effects on the measurement.

SUMMARY OF THE INVENTION

The present invention consequently addresses the problem of eliminating the disadvantages of prior art. The present invention in particular addresses the problem of realizing a compact diaphragm vacuum measuring cell device with an integrated heater and electronic measuring circuitry, which can be operated stably over a greater temperature range, wherein the temperature of the electronic circuitry and the measuring cell are decoupled from one another. The measuring cell is to be employable in particular in acid- and/or halogen-containing aggressive vacuum processes, such as are utilized in particular in the semiconductor production. The measuring cell is, moreover, to be economically producible.

The problem is resolved in the generic vacuum measuring cell device according to the invention. The patent claims relate to advantageous further physical forms of the invention.

According to the invention a diaphragm vacuum measuring cell is disposed within a thermal container, which forms a heating configuration and thereby heats the measuring cell to the desired temperature, wherein the measuring cell connection for the vacuum pressure measurement is carried through the thermal container and in this region the thermal container is implemented as a thermal body in which a heat source is disposed. The thermal container is encompassed by an insulation jacket in order to insulate the heated thermal body against the environment and thereby to ensure the lowest possible temperature gradients in the thermal container at low heat losses. Hereby a homogeneous temperature distribution on the measuring cell is made feasible at compact construction.

The vacuum measuring cell device includes in particular a diaphragm vacuum measuring cell with a diaphragm as a pressure transducer, wherein on the one side of the diaphragm spaced apart from it a first housing plate is disposed under sealing in the margin region using a bonding means, such that between them a reference vacuum volume is formed, and that on the other side of the diaphragm spaced apart from it a second housing plate is disposed under sealing in the margin region using a bonding means, such that between them a measuring vacuum volume is formed, and that the second housing plate comprises an opening at which connection means are disposed under sealing with bonding means, for the communicating connection of the measuring vacuum volume with the medium to be measuring of a vacuum process system. The measuring cell device includes electronic circuitry electrically connected with the diaphragm vacuum measuring cell. The measuring cell device includes furthermore a heating configuration for heating the diaphragm vacuum measuring cell to a predeterminable temperature value. The heating configuration encompasses substantially completely the diaphragm vacuum measuring cell such that it forms a thermal container, wherein this container in the region of the connection means forms a thermal body, through which a connection means, such as a connection tube, is carried and at least in subregions is herein thermally contacted by the thermal body. The thermal body includes a heat source which heats the thermal body up to the desired temperature, and the temperature is distributed via heat conduction over the entire thermal container uniformly about the diaphragm vacuum measuring cell and such cell is substantially brought to the same temperature. The thermal container is for this purpose substantially completely encompassed by an insulation jacket.

This structure is especially suitable for the highly sensitive diaphragm vacuum measuring cells. In order to be able to cover wide pressure ranges, diaphragm thicknesses in the range of a few 10 μm up to a few 100 μm, preferably in the range of 25 μm to 950 μm, the housing as well as the diaphragm are produced of an aluminum oxide ceramic. A preferred embodiment for a capacitive diaphragm vacuum measuring cell has been described in said U.S. Pat. No. 6,591,687 and a preferred embodiment for an optical diaphragm vacuum measuring cell has been described in said patent application US 2007 0089524 A1. For both measuring cell types the two housing plates and the diaphragm located between them are preferably fabricated of a corrosion resistant metal oxide ceramic, preferably of an aluminum oxide ceramic. By using aluminum oxide of the modification sapphire in particular for the diaphragm, the thermal properties can additionally be improved in both types of cells. Mixed forms of the ceramic types can also be utilized on the measuring cell. In the case of the ODG cell, at least for the light coupling-in and coupling-out onto/from the diaphragm, a transparent window, for example comprised of sapphire, is necessary. This specially selected combination of the diaphragm measuring cell with its specific structure, combined with the specific heating configuration introduced here, permits highly precise reproducible measurements with high resolution at large measuring ranges, wherein the device is compactly and economically realizable. Moreover, herewith the sensitive electronic circuitry for the signal processing of the measuring cell signals can also be disposed in the proximity of the measuring cell in a protected region.

The various features of novelty which characterize the invention are pointed out with particularity in the claims annexed to and forming a part of this disclosure, and are entirely based on the Swiss priority application no. 985/07 filed Jun. 19, 2007.

BRIEF DESCRIPTION OF THE DRAWINGS

In the following the invention will be described schematically and by example in conjunction with Figures.

In the drawing depict.

Figure 1A:
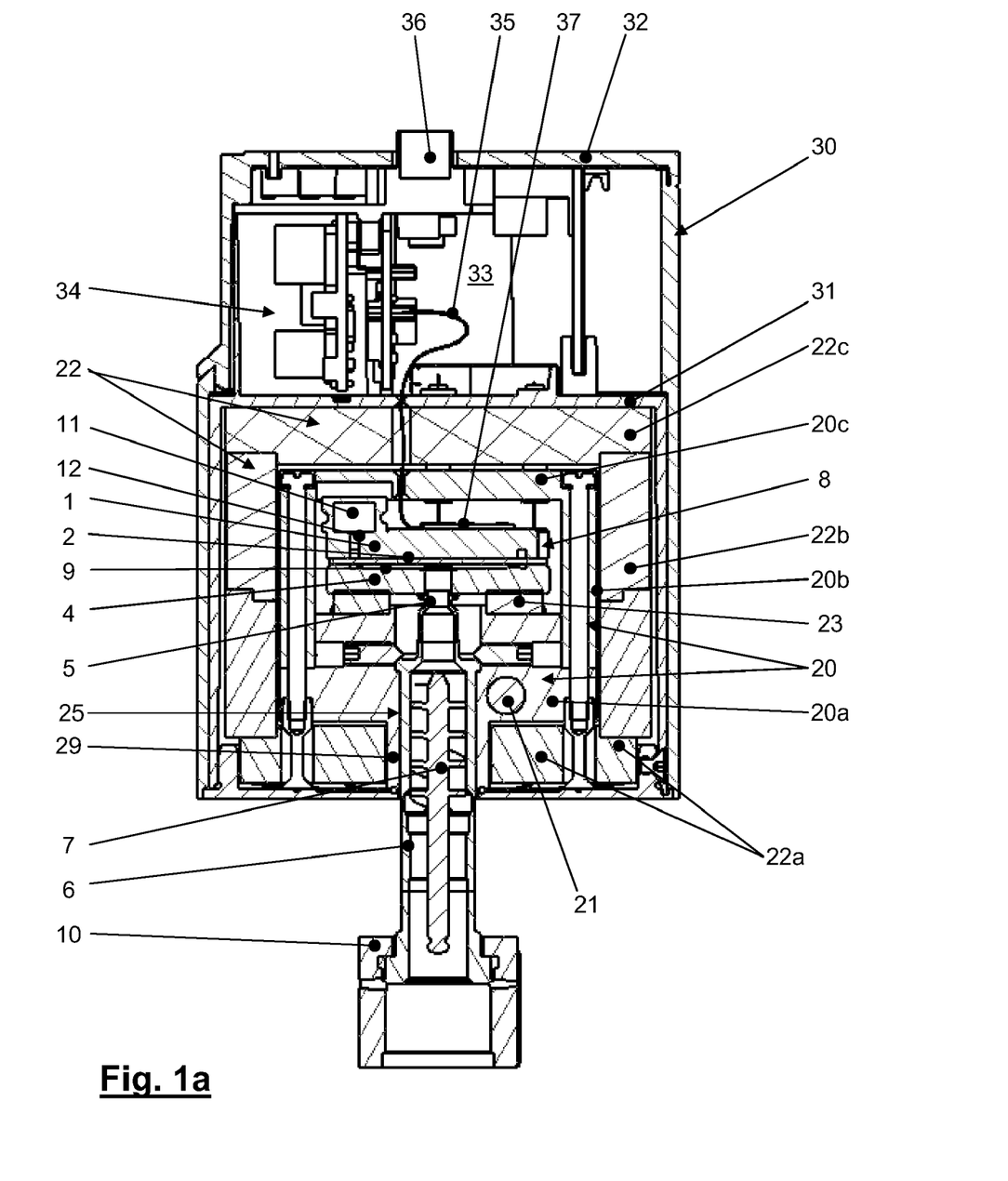
FIG. 1a schematically and in cross section a vacuum measuring cell device according to the invention with integrated diaphragm vacuum measuring cell, heating configuration and electronic measuring circuitry in which the electronic interface circuitry is disposed on the measuring cell body within the thermal container, FIG. 1b schematically and in cross section a vacuum measuring cell device according to the invention with integrated diaphragm vacuum measuring cell, heating configuration and electronic measuring circuitry in which the electronic interface circuitry is disposed outside of the thermal container, FIG. 2 schematically and in cross section a vacuum measuring cell device according to FIGS. 1a and 1b with gas heat exchanger means for the measured gas formed in the throughguide region of the connection tube of the measuring cell through the thermal body, FIG. 3 schematically and in cross section according to FIG. 2 a variant of the gas heat exchanger means with inlets, realized in the form of labyrinths, for the measured gas as additional protective baffle, FIG. 4 schematically and in cross section according to FIG. 3 a variant of the implementation of the gas heat exchanger means with protective baffle, FIG. 5 schematically and in cross section according to FIG. 3 a variant of the implementation of the gas heat exchanger means with protective baffle.
Figure 1B:
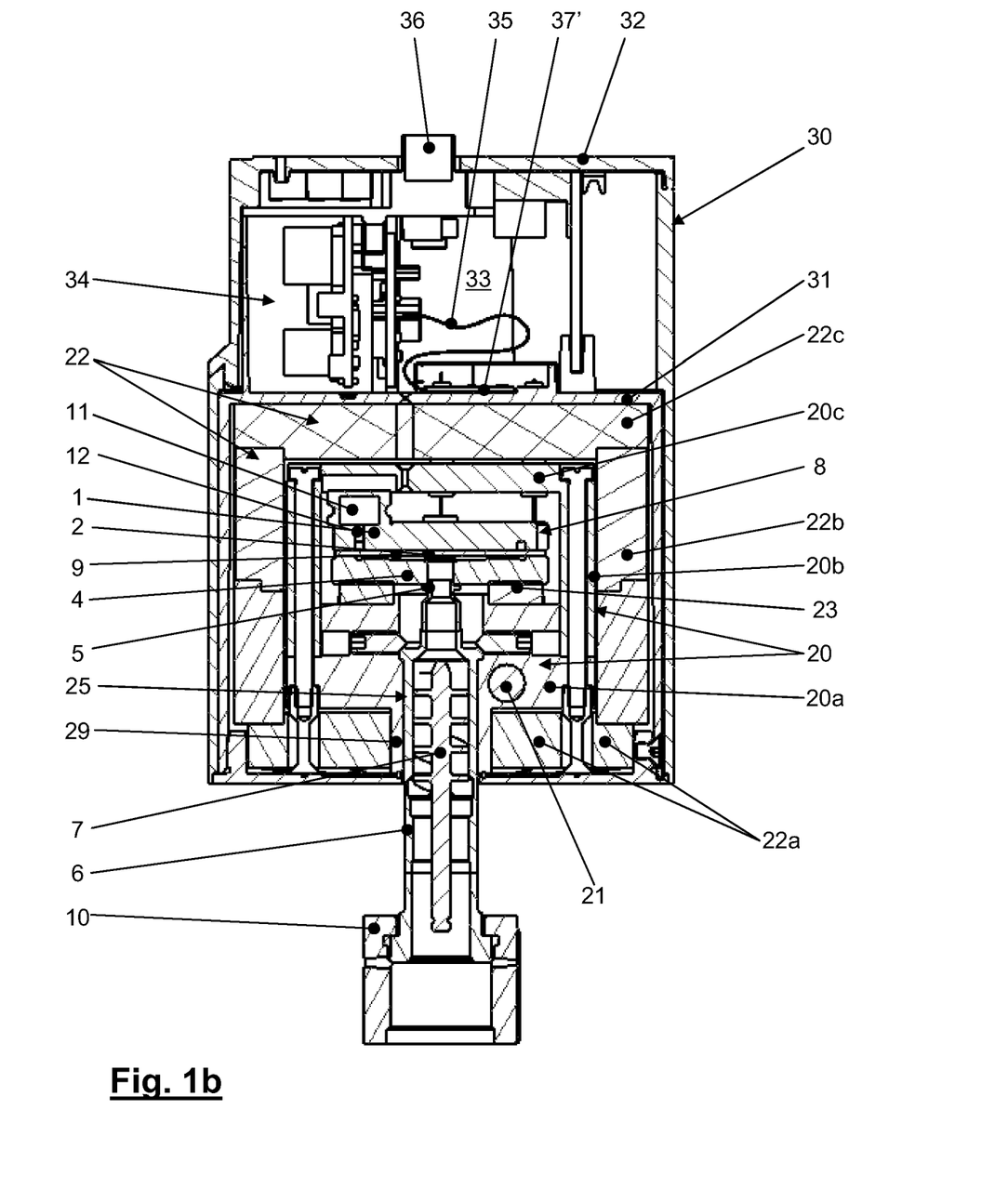
Figure 2:
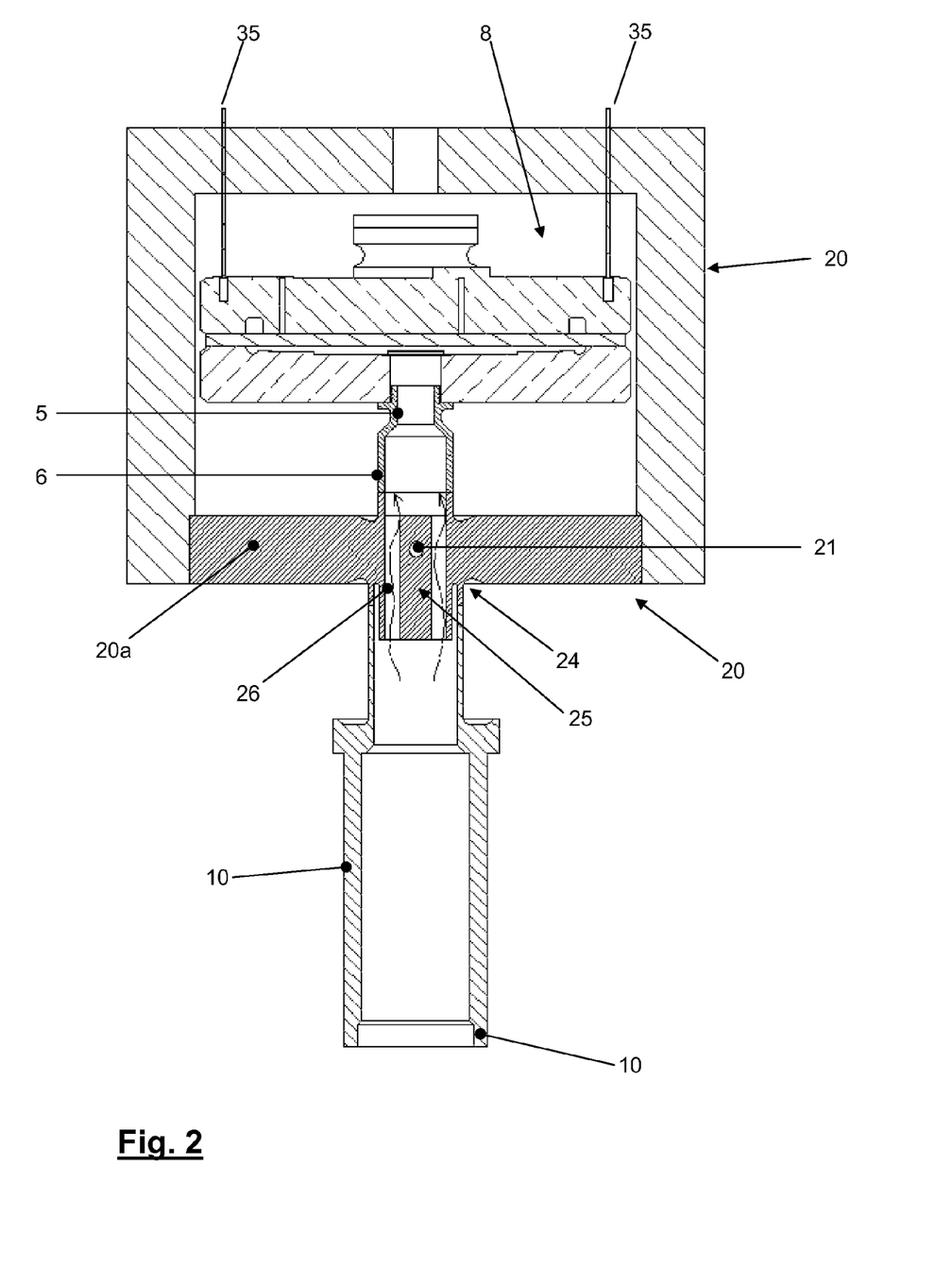

A preferred example of a vacuum measuring cell device which comprises a diaphragm vacuum measuring cell 8, here as a preferred capacitive diaphragm measuring cell 8 (CDG), is shown schematically and in cross section in FIG. 1a and FIG. 1b. This capacitive measuring cell 8 is comprised of $Al_2O_3$ with a structure disposed substantially completely symmetrically to the diaphragm face. The first housing body 1 is comprised of a ceramic plate, preferably of $Al_2O_3$, which is connected at a distance of 2 μm to 50 μm opposite the ceramic diaphragm 2 under sealing in the margin region and encloses a reference vacuum volume. In this manner, a completely planar housing plate 1 can be utilized. In the same manner with a second housing body 4 on the opposite diaphragm side a measuring vacuum volume 9 is formed, which can be reached by the media to be measured via connection means 5 through an opening in the second housing body 4. The connection means 5, 6 can be realized as pipe fittings with a connection line or as a tube 6 and are connected under sealing using bonding means, for example a glass solder, with the second housing body 4. These connection means can be comprised of a suitable metal, such as Vacon, or preferably also of a corrosion resistant ceramic as the measuring cell 8 with the two housing bodies 1, 4 and the diaphragm 2. At the other end the connection tube 6 forms the measuring cell connection 10 which permits connecting the vacuum measuring cell device such that it communicates with the vacuum process chamber to be measured.

In a typical measuring cell 8 with an outer diameter of 38 mm and a free diaphragm inner diameter of 30 mm the diaphragm distance is approximately 2 to 50 μm, preferably 12 to 35 μm. The first housing body 1 is herein for example 5 mm thick, the second housing body 4, 3 mm thick, preferably 5 mm. The second housing body 4 is preferably provided in the inner region with an approximately 0.5 mm deep recess for the formation of a step in order to enlarge the measuring vacuum volume 9. The diaphragm 2 and the housing 1 are each coated on the reference vacuum volume side, for example for the formation of a capacitive measuring cell 8, with an electrically conducting layer. The two layers are not electrically connected with one another and thereby form a capacitor arrangement.

The layers can, for example, be painted on, printed on, sprayed on or be applied using a vacuum method. They are preferably applied using a vacuum method, such as vapor deposition or sputtering. As the layer material is especially suitable gold, which is vapor deposited, for example at a layer thickness of 1 μm, and is subsequently thinned by means of sputter etching to a few nanometers, for example 5 nm. The layer can thereby be set defined as to thickness and sufficiently thin to be stress-free. The electrical connections of the conducting layers are preferably carried out with vacuum-tight, electrically conducting throughguides, preferably through the housing body 1, where they can subsequently be connected with the electronic analysis circuitry 34, 37, 37' via measuring lines 35, in particular across electronic interface circuitry 37, 37'.

In order to be able to maintain a long-term stable reference vacuum in the reference vacuum volume, a getter volume 11 with a getter is preferably provided. This getter is preferably a non-vaporizable getter in order to maintain the reference vacuum volume free of vaporizing particles. On the first housing body 1 is provided a getter volume 11 for receiving the getter, which is connected across a connection line 12 or pump-down line with the reference vacuum volume. The getter volume 11 can be placed onto the housing body 1 or set into the housing 1.

Similarly structured is also an optically readable diaphragm measuring cell 8 (ODG). In this case capacitor coatings are not required. On the first housing body 1 in the central region an optically transparent window is disposed via which, preferably using an optic fiber, light is coupled in and guided to the diaphragm surface. This surface is coated with a reflecting coating in order to reflect the light back. At the housing window additionally a partially reflecting mirror can be located. This configuration permits the interferometric analysis of the diaphragm deflection with the aid of a Fabry-Perot interferometer. The optical window is preferably comprised of sapphire and is set into the first housing body 1 and here connected vacuum-tight with sealing means 3, such as a glass solder. However, the first housing body 1 can also be produced entirely of sapphire. The diaphragm measuring cells, in particular the two housing bodies and the diaphragm, are formed of a metal oxide or a ceramic in order to achieve high corrosion resistance. Herein is preferably utilized an aluminum oxide ($Al_2O_3$). The alpha modification of the aluminum oxide is preferred. Especially preferred is the sapphire aluminum oxide modification. Several metal oxides can be combined. For example, a customary aluminum oxide for the first housing body 1 can be combined with a sapphire window. Or the diaphragm 2 can be comprised of sapphire and the housing bodies can be comprised of simpler modifications of aluminum oxide, or of other metal oxides. The implementation of the diaphragm 2 of sapphire has special advantages with respect to thermal behavior and greater elasticity attained. Greater deflections can thereby be allowed, whereby the measuring range is expanded. Suitable ceramic materials are also zirconium oxide ($ZrO_2$) and/or silicon nitride ($Si_3N_4$). Additional suitable ceramic materials are titanium oxide ($TiO_2$) and/or silicon carbide (SiC). Combinations of these materials within the measuring cell structure are feasible. However, the materials within the same substance group are preferred, thus for example the combination of different $Al_2O_3$ forms, such as aluminum oxide and sapphire. Under especially high requirements made of the corrosion resistance, the connection means 5, 6, such as the tube 6, or parts thereof, can also be comprised of said ceramic materials.

As shown in FIGS. 1 to 5 the diaphragm measuring cell 8 is disposed within a heated thermal container 20. The thermal container 20 encompasses substantially completely the diaphragm measuring cell 8 and is fabricated of a material that is a good heat conductor, such as aluminum or copper. The mass is large enough such that the heat is distributed as homogeneously as is possible about the measuring cell and thus has a very low temperature gradient. This is also made possible thereby that the thermal body 20 is substantially completely encompassed by a thermal insulation jacket 22 with high insulation effect.

For this purpose insulation materials are preferred with especially good insulation values. For the highly insulating insulation jacket 22 insulation values are especially suitable that have a k-value less than 0.05 W/(mK), preferably less than 0.02 W/(mK).

The insulation jacket can, for example, be formed from a type of Dewar vessel, which is comprised, for example, of a thin-walled evacuated metal vessel of stainless steel. Especially suitable is the insulation material pyrogenic silica for the formation of an insulation jacket, which is preferably additionally encapsulated.

For the various process applications the diaphragm vacuum measuring cell 8 is to be heated to temperatures in the range of 20° C. to 220° C., or preferably in the range of 20° C. to 500° C. in order to avoid as much as possible undesired condensation of particles within the measuring cell which originate from the process environment. The heating configuration 20, 21 is comprised of the thermal container 20 into which at a certain location a heat source, preferably an electric heat source is set for heating the thermal container 20. The desired operating temperature can be preset appropriately with electronic circuitry 34 within said temperature range and also preferably be precisely regulated to a stable value. For the temperature acquisition for the temperature regulation circuit is suitable a temperature sensor 38, which measures the temperature of the thermal container 20 or directly that of the diaphragm measuring cell 8 and conducts the signal to the electronic regulation circuitry.

It is advantageous if the thermal container 20, which holds the measuring cell 8, is formed in several parts and these parts are thermally connected with one another such that they conduct heat well. The thermal container should include at least a bottom body which can be closed with a bell-shaped hood. The bottom body herein forms a thermal body 20a and receives the heat source 21, for example an electric heating cartridge, which is in thermal contact with this body. The thermal container can also be formed in several parts and, in addition to a thermal body 20a as a bottom part, also comprise an encompassing tubular thermal container wall 20b with a terminating thermal container cover 20c. Highly suitable is herein the implementation of a cylindrical thermal container 20, such as is depicted in FIGS. 1 to 5.

The connection means 6, such as the connection tube 6, of the measuring cell is carried through this thermal body 20a and is in thermal contact with it. The heat source 21 is advantageously disposed in the proximity of this throughguide region 24 whereby here a region with the highest temperature in the system is formed. In order to make the heat transfer onto the connection tube 6 even more efficient and homogeneous, it is useful to dispose on the thermal body an additional heat distribution element 29, for example a projection which is in thermal contact with the wall of the connection tube 6. The configuration permits heating that is very uniform and only has minimal temperature gradients. So-called cold spots on the connection tube 6, and thus undesirable condensation zones, can thereby be avoided. Therewith is additionally attained that a remaining, even if minimal, temperature gradient extends in a defined predetermined direction, namely with a monotonic course from the measuring site, the measuring connection 10, up to the diaphragm 2 of the diaphragm vacuum measuring cell 8. Such a projection as a heat distribution element 29 can be provided on one side or on both sides of the thermal body 20a, preferably at least on the outside of the thermal body 20a in the direction of the measuring cell connection 10.

The disposition of the diaphragm vacuum measuring cell 8 within the thermal container 20 takes place by mounting it on the thermal body 20a with thermal contacting of the thermal body 20a, which, together with the heat source 21, forms the warmest region of the system. The thermal contacting of the diaphragm vacuum measuring cell 8 with the thermal body 20a preferably takes place with the aid of a heat conducting means 23 disposed between them.

The insulation jacket can also be embodied in several parts, for example with an insulation bottom part 22a, a cylindrical insulation wall part 22b and a terminating insulation cover part 22c. The parts of the thermal container 20 and the parts of the insulation jacket can be fastened with one another for example through threaded connections and/or by glueing. It must herein be observed that the important functions, such as insulation and heat behavior, are thereby not impermissibly impaired.

The diaphragm vacuum measuring cell 8, the thermal container 20 and the insulation jacket are encompassed by a carrier part 31, which thus has the function of a housing for encapsulating the entire device. This carrier part is comprised of a metal, for example nickel casting, in order to attain a high degree of electric shielding for the sensitive signals of the measuring cell 8. The entire electronic circuitry 34 is advantageously disposed on the upper cover part of the carrier part 31, in a chamber 33 whereby the carrier part 31 can dissipate the power loss of the electronic circuitry 31, in particular of the power components for the heating regulation. The electronic circuitry 34 comprises substantially:

an I/O part with the signal connections 36 for the peripheral communication of the vacuum measuring cell device to the outside,
a microprocessor system for the signal processing,
a heating regulation,
an electronic field bus circuitry.

In addition to this electronic analysis circuitry 34, an electronic interface circuitry 37, 37' is employed, which processes the highly sensitive measuring signals from the diaphragm measuring cell 8 and transfers them in suitable amplified form across the signal line 35 to the electronic analysis circuitry 34. The connection lines from the electronic measuring circuitry 37, 37' to the diaphragm measuring cell 8 should be as short as feasible due to the high sensitivity. During the operation of the diaphragm vacuum measuring cell 8 at temperatures below 100° C., preferably below 70° C., the electronic interface circuitry 37 is advantageously disposed directly on the housing 4 of the diaphragm vacuum measuring cell 8 and only connected across very short connection lines with their capacitor coatings, such as is depicted in FIG. 1a. At temperatures higher than 100° C., preferably already starting at 50° C., the electronic interface circuitry 37' must be disposed outside of the heated region, thus outside of the insulation jacket in the cool region, as is shown in FIG. 1b, in order for this interface circuitry not to be destroyed. Here also it is necessary to observe that the electric connection lines to the diaphragm measuring cell are as short as feasible and, in the throughguide region of the thermal container 20 and of the insulation jacket 22, do not disturb their functions. The entire device including the electronic circuitry is additionally protected with an encompassing housing disposition 30. In the region of the electronic circuitry 34 this housing disposition can be formed as a separate removable hood 32 for easy accessibility.

For additional protection, in the connection tube 6 can be provided a protective means, a baffle 7, for the additional protection against bombardment of the diaphragm 2 with particles. Such a baffle 7 is intended to prevent direct line of sight and thereby prevent the penetration for undesirable particles from the vacuum process to the diaphragm 2 and only allow the desired measured gas to pass. A suitable implementation of such a screen as a baffle 7 is a spiral helical configuration as is depicted in FIGS. 1a and 1b.

To improve the heating effect further in the throughguide region 24 of the connection tube 6 through the thermal body 20a onto the gas to be measured penetrating here, additionally a heat exchanger means 25 can here be provided which increases the heat transfer area within the passage region. This can take place, for example, with additional bores or channels, such as is shown in cross section in FIG. 2. Thereby an even more effective temperature control of the measured gas is made feasible during the passage into the diaphragm vacuum measuring cell.

Figure 3:
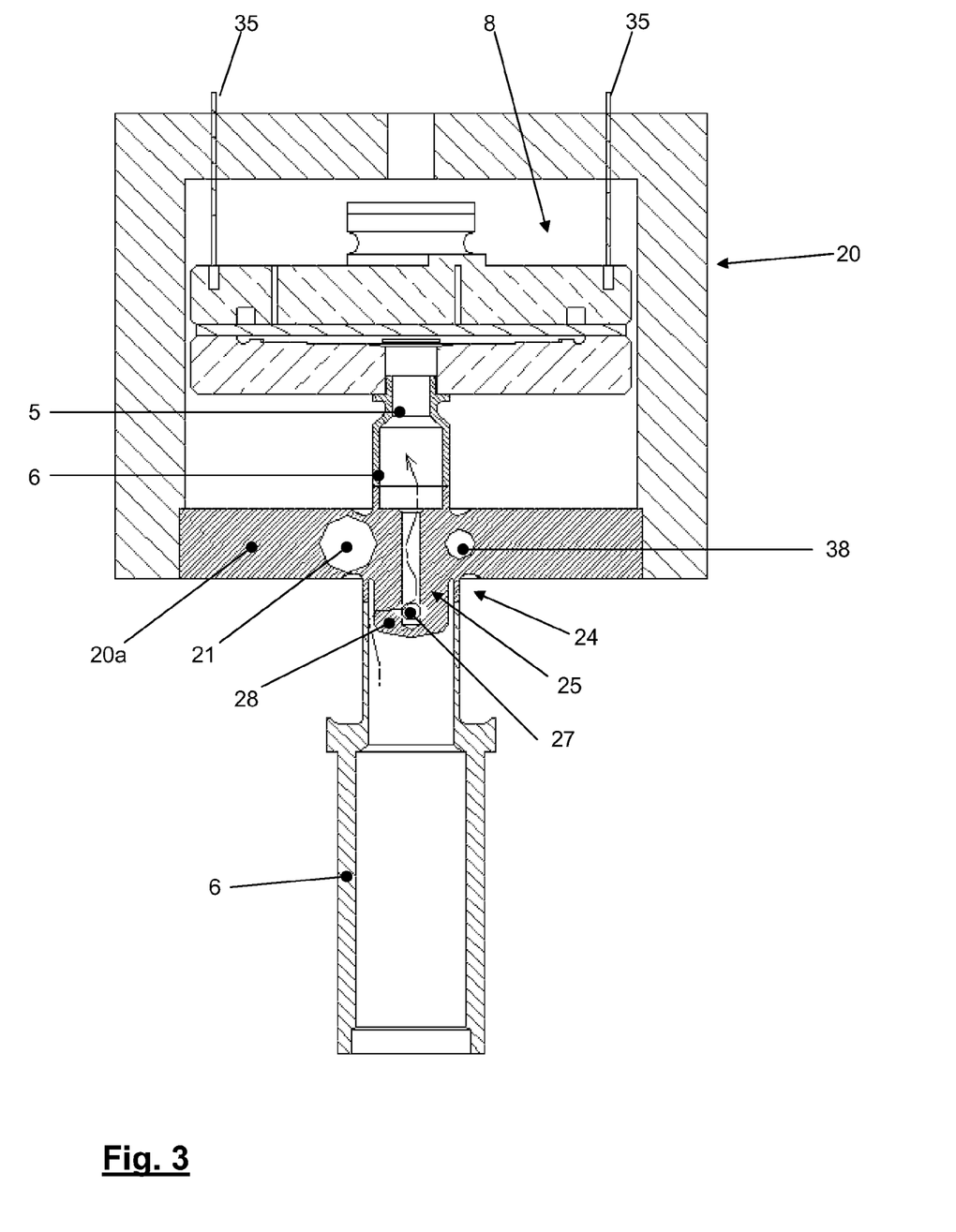
Figure 4:
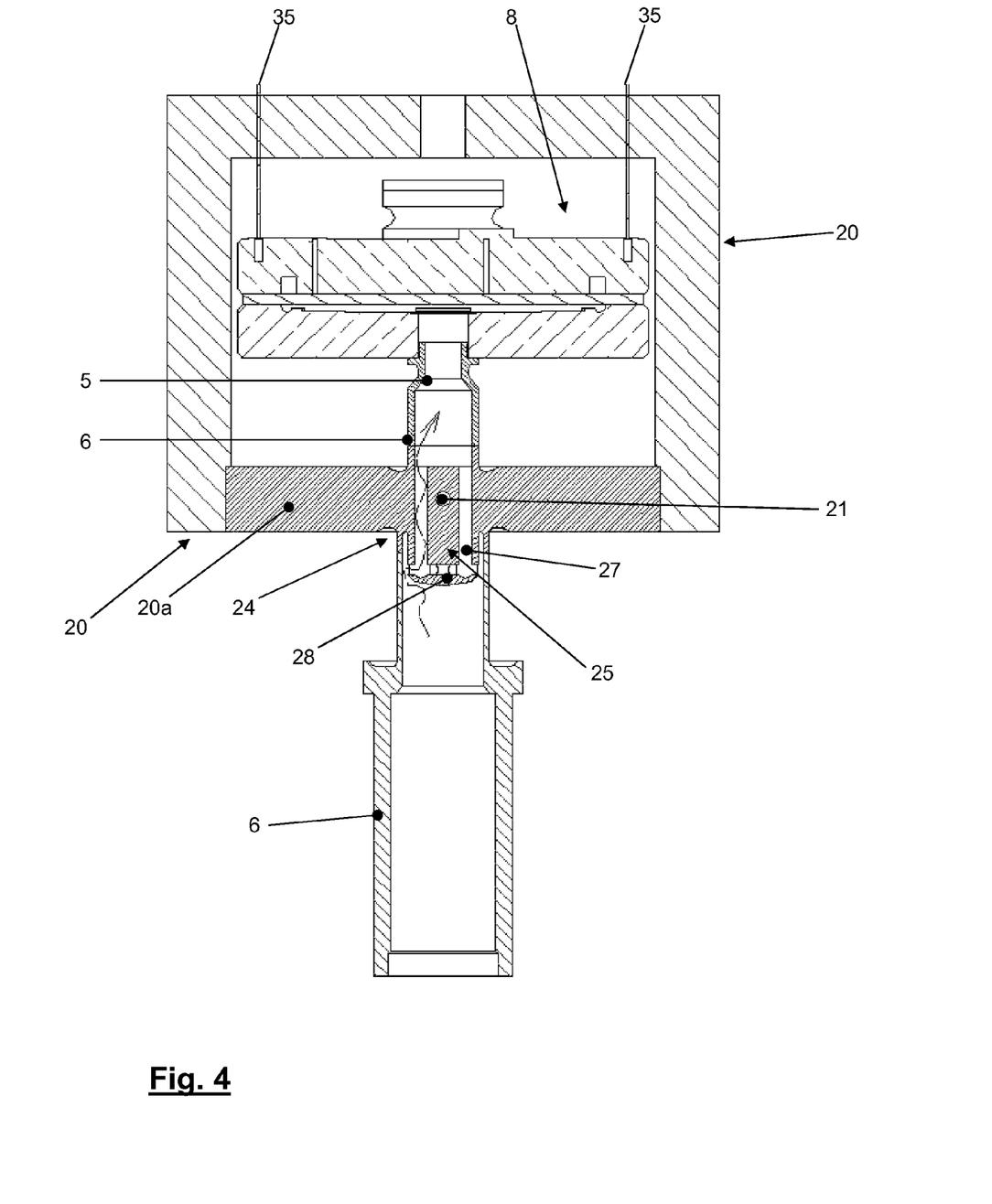
Figure 5:
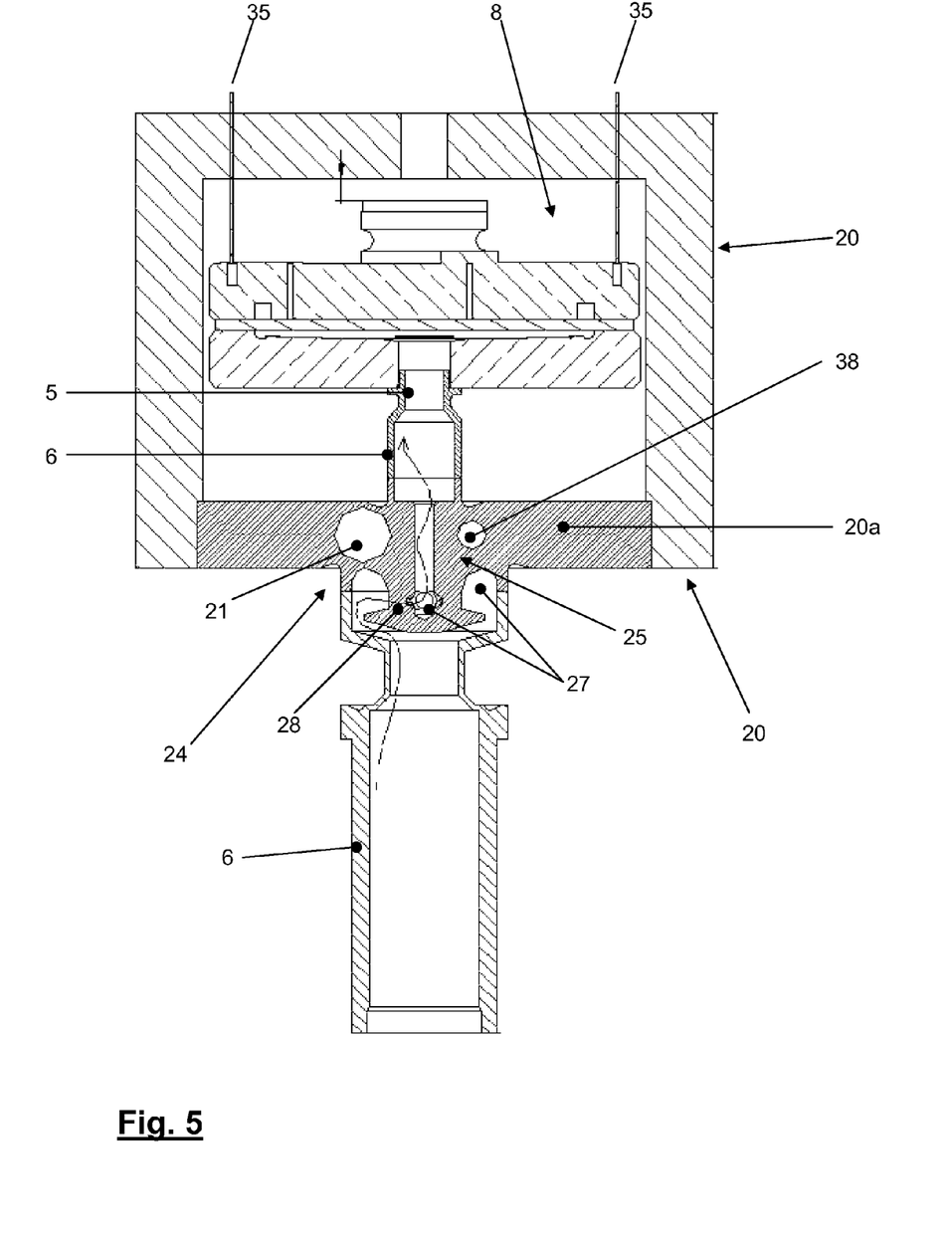

There is in addition the feasibility of forming such bores or channels 26 in the form of labyrinths 27 such that no direct line of sight exists in the direction toward the diaphragm 2, whereby additionally the protective effect of baffle 28 is generated similarly to the aforementioned helical screen 7. FIG. 3 depicts schematically a configuration with a central bore in the longitudinal direction toward the connection tube 6 and with transverse bores opening out into this tube. A variant thereof includes at the input side a projecting head 28 around which the measuring gas is conducted and is shown schematically in FIG. 5. In FIG. 4 is depicted a further variant with several central bores. These implementations can additionally be combined with a screen configuration, such as a helical baffle 7.

In the case of all of these variants it is feasible to dispose the heat source 21 directly within the heat exchanger means 25, thus as close as is feasible to the region of the penetrating gas, such as is shown schematically and by example in FIG. 4. It is also feasible to use more than one heat source 21. Herein, for example one heat source can be disposed in the thermal body 20a and a second heat source in the heat exchanger means 25.

As depicted in FIGS. 2 to 5, the connection tube 6 can also be implemented as a divided tube and the heat exchanger means 25 can be integrated into the thermal body 20a. In addition to the measures for good heat coupling with a heat exchanger means 25 in the throughguide region 24 of the connection tube 6, it is also feasible to form the temperature distribution along the tube with a type of thermal brake through the manner of the geometric formation of the thermal body 20a and/or of the connection tube 6. It becomes thereby possible to delimit additionally also thermal effects from the installation side, the measuring cell connection 10.

With all of these proposed implementations a high protective effect of the sensitive diaphragm 2 can be attained. Together with the precise and stable temperature management, a highly precise vacuum measuring cell device can be realized which is producible in compact form and cost-effectively and is also suitable for applications in difficult vacuum process environments.

The invention claimed is:

1. Vacuum measuring cell device comprising a diaphragm vacuum measuring cell (8) with a diaphragm (2) acting as a pressure transducer, wherein on one side of the diaphragm (2) spaced apart from it a first housing plate (1) is disposed under sealing in a margin region of the diaphragm using a bonding, such that a reference vacuum volume is formed between them, and that on an other side of the diaphragm (2) spaced apart from it a second housing plate (4) is disposed under sealing in the margin region using a bonding, such that a measuring vacuum volume (9) is formed between them, and that the second housing plate (4) includes an opening on which connection means (5, 6) are disposed under sealing using a bonding for the communicating connection of the measuring vacuum volume (9) with the medium to be measured, the measuring cell device including electronic circuitry (34) which is electrically connected with the diaphragm vacuum measuring cell (8), and the measuring cell device includes a heating configuration (20, 21) for heating the diaphragm vacuum measuring cell (8) to a predeterminable temperature value, and wherein the heating configuration (20, 21) substantially completely encompasses the diaphragm vacuum measuring cell (8) such that it forms a thermal container (20), wherein this container forms a thermal body (20a) in the proximity of the connection means (5, 6) through which connection means (6) are carried and herein are thermally contacted at least in subregions by the thermal body (20a), and that the thermal body (20a) includes a heat source (21), wherein the thermal container (20) is substantially completely enclosed by an insulation jacket (22).

2. Vacuum measuring cell device as claimed in claim 1, wherein the connection means (6) is tubular.

3. Vacuum measuring cell device as claimed in claim 1, wherein the heat source (21) is implemented as an electric heat source (21).

4. Vacuum measuring cell device as claimed in claim 3, wherein the heat source (21) forms a heat insert and is integrated into the thermal body (20a), and wherein the heat insert is a heat cartridge.

5. Vacuum measuring cell device as claimed in claim 1 wherein a heat conduction means (23) is provided between the diaphragm vacuum measuring cell (8) and the thermal body (20a) for conducting heat.

6. Vacuum measuring cell device as claimed in claim 1 wherein the insulation jacket (22) is implemented such that it is highly insulating with a k-value of less than 0.05 W/(mK).

7. Vacuum measuring cell device as claimed in claim 1 wherein the heating configuration (20, 21) covers temperatures in the range of 20° C. to 220° C.

8. Vacuum measuring cell device as claimed in claim 1, wherein on the thermal body (20*a*) a temperature sensor (38) is disposed and this sensor is operationally connected with an electronic regulator and the heat source (21) for the precise setting of a predeterminable temperature value.

9. Vacuum measuring cell device as claimed in claim 1 wherein the connection means (6) has a throughguide (24) region through the thermal body (20*a*), the throughguide region (24) having an additional heat exchanger means (25) implemented for the effective temperature control of a measured gas during its passage into the diaphragm vacuum measuring cell (8).

10. Vacuum measuring cell device as claimed in claim 9, wherein the heat exchanger means (25) includes at least one channel and this channel is implemented as a labyrinth.

11. Vacuum measuring cell device as claimed in claim 1, wherein the connection means (6) includes a measuring cell connection (10) for the connection with a medium to be measured, wherein a monotonically increasing temperature gradient is set from the measuring cell connection (10) to the diaphragm vacuum measuring cell (8).

12. Vacuum measuring cell device as claimed in claim 1, wherein at least the diaphragm (2) and the two housing plates (1, 4) are at least partially comprised of a metal oxide.

13. Vacuum measuring cell device as claimed in claim 1, wherein the diaphragm measuring cell (8) is a capacitive diaphragm measuring cell (8) or an optically readable diaphragm measuring cell (8), such as with a Fabry-Perot system.

14. Vacuum measuring cell device as claimed in claim 1, wherein the connection means (6) is tubular and comprised of a metal.

15. Vacuum measuring cell device as claimed in claim 1, wherein the connection means (6) is tubular and comprised of Inox.

16. Vacuum measuring cell device as claimed in claim 1, wherein the insulation jacket (22) is implemented such that it is highly insulating with a k-value of less than 0.02 W/(mK).

17. Vacuum measuring cell device as claimed in claim 1, wherein the heating configuration (20, 21) covers temperatures in the range of 20° C. to 500° C.

18. Vacuum measuring cell device as claimed in claim 9, wherein the heat exchanger means (25) includes at least one channel implemented as a labyrinth that forms a baffle.

19. Vacuum measuring cell device as claimed in claim 1, wherein at least the diaphragm (2) and the two housing plates (1, 4) are at least partially comprised of a metal oxide that is selected from the group consisting of: aluminum oxides and aluminum oxides of a sapphire form.

20. Vacuum measuring cell device as claimed in claim 1, wherein the diaphragm measuring cell (8) is an optically readable diaphragm measuring cell (8) of a Fabry-Perot system.

* * * * *